United States Patent
Du et al.

(10) Patent No.: US 9,669,767 B2
(45) Date of Patent: Jun. 6, 2017

(54) VEHICLE STEP APPARATUS

(71) Applicant: T-MAX (HANGZHOU) INDUSTRIAL CO., LTD., Fuyang (CN)

(72) Inventors: Xinfa Du, Fuyang (CN); Yongyong Zhan, Fuyang (CN); Qi Zhang, Fuyang (CN)

(73) Assignee: T-MAX (HANGZHOU) INDUSTRIAL CO., LTD, Fuyang (CN)

( * ) Notice: Subject to any disclaimer, the term of this patent is extended or adjusted under 35 U.S.C. 154(b) by 88 days.

(21) Appl. No.: 14/929,720

(22) Filed: Nov. 2, 2015

(65) Prior Publication Data

US 2017/0036606 A1    Feb. 9, 2017

(30) Foreign Application Priority Data

Aug. 4, 2015  (CN) .......................... 2015 1 0469324
Aug. 4, 2015  (CN) ..................... 2015 2 0580148 U

(51) Int. Cl.
*B60R 3/02* (2006.01)

(52) U.S. Cl.
CPC ..................... *B60R 3/02* (2013.01)

(58) Field of Classification Search
CPC .............. B60R 3/00; B60R 3/02; B60R 3/002
See application file for complete search history.

(56) References Cited

U.S. PATENT DOCUMENTS

| 5,425,615 A | 6/1995 | Hall et al. |
| 7,163,221 B2* | 1/2007 | Leitner ..................... B60R 3/02 |
| | | 105/444 |

(Continued)

FOREIGN PATENT DOCUMENTS

| CN | 2806241 Y | 8/2006 |
| CN | 101279594 A | 10/2008 |

(Continued)

OTHER PUBLICATIONS

International Search Report and Written Opinion of the International Searching Authority for PCT International Application No. PCT/CN2015/097930 mailed May 10, 2016.

*Primary Examiner* — Brian Swenson
(74) *Attorney, Agent, or Firm* — Howard & Howard Attorneys PLLC

(57) ABSTRACT

Provided is a vehicle step apparatus comprising a first extending and retracting device comprising a first mounting bracket, a first step bracket, and a first arm assembly coupled between the first mounting bracket and the first step bracket and configured to drive the first step bracket to move between an extending position and a retracting position; a second extending and retracting device comprising a second mounting bracket, a second step bracket, and a second arm assembly configured to drive the second step bracket to move; a step mounted on the first step bracket and the second step bracket; a single motor mounted on the first mounting bracket and having a motor shaft coupled with the first arm assembly; and a transmission shaft defining a first end coupled with the motor shaft, and a second end coupled with the second arm assembly via a braking device.

20 Claims, 10 Drawing Sheets

(56) References Cited

U.S. PATENT DOCUMENTS

| | | | |
|---|---|---|---|
| 2006/0214386 A1* | 9/2006 | Watson | B60R 3/02 280/163 |
| 2008/0042396 A1* | 2/2008 | Watson | B60R 3/02 280/166 |
| 2008/0100023 A1* | 5/2008 | Ross | B60R 3/02 280/166 |
| 2009/0250896 A1* | 10/2009 | Watson | B60R 3/02 280/166 |
| 2009/0295114 A1 | 12/2009 | Yang et al. | |
| 2010/0044993 A1* | 2/2010 | Watson | B60R 3/02 280/166 |
| 2013/0154230 A1* | 6/2013 | Ziaylek | B60R 3/02 280/166 |
| 2015/0097353 A1 | 4/2015 | Rasmussen et al. | |
| 2015/0197199 A1* | 7/2015 | Kuo | B62J 25/00 280/166 |
| 2016/0039346 A1 | 2/2016 | Yang et al. | |

FOREIGN PATENT DOCUMENTS

| | | |
|---|---|---|
| CN | 202806579 U | 3/2013 |
| CN | 104192070 A | 12/2014 |
| CN | 105083137 A | 11/2015 |
| CN | 105128751 A | 12/2015 |

\* cited by examiner

A-A

VEHICLE STEP APPARATUS

CROSS-REFERENCE TO RELATED APPLICATIONS

This application claims priority to and benefits of Chinese Patent Application Serial No. 201510469324.4 and No. 201520580148.7, both filed with the State Intellectual Property Office of P. R. China on Aug. 4, 2015, the entire contents of which are incorporated herein by reference.

BACKGROUND OF THE INVENTION

1. Field of the Invention

Embodiments of the present invention generally relate to the field of vehicle, and more particularly, to a vehicle step apparatus.

2. Description of the Related Art

A vehicle step apparatus mounted on a chassis of a vehicle is used to assist passengers to get on or off the vehicle. The extending and retracting device of the vehicle step apparatus is driven by a motor, and then the step is driven to move between an extending position and a retracting position. In the related art, if the step is driven by two extending and retracting devices, two motors are needed to drive the two extending and retracting devices respectively. The control of the two motors is complex, and the two extending and retracting devices may interfere with each other if the two motors is not synchronous.

In addition, when the step is in the retracting position, the step droops under the gravity of the step and the gravity of the extending and retracting device.

SUMMARY OF THE INVENTION

The present invention seeks to solve at least one of the technical problems existing in the related art. Therefore, embodiments of the present invention provide a vehicle step apparatus. The vehicle step apparatus can prevent the first extending and retracting device and the second extending and retracting device from drooping.

A vehicle step apparatus according to embodiments of the present invention includes: a first extending and retracting device comprising a first mounting bracket, a first step bracket, and a first arm assembly coupled between the first mounting bracket and the first step bracket and configured to drive the first step bracket to move between an extending position and a retracting position; a second extending and retracting device comprising a second mounting bracket, a second step bracket, and a second arm assembly coupled between the second mounting bracket and the second step bracket and configured to drive the second step bracket to move between the extending position and the retracting position; a step mounted on the first step bracket and the second step bracket; a single motor mounted on the first mounting bracket and having a motor shaft coupled with the first arm assembly; and a transmission shaft defining a first end coupled with the motor shaft, and a second end coupled with the second arm assembly via a braking device.

A vehicle step apparatus according to embodiments of the present invention includes: a first extending and retracting device comprising a first mounting bracket, a first step bracket, and a first arm assembly coupled between the first mounting bracket and the first step bracket and configured to drive the first step bracket to move between an extending position and a retracting position; a second extending and retracting device comprising a second mounting bracket, a second step bracket, and a second arm assembly coupled between the second mounting bracket and the second step bracket and configured to drive the second step bracket to move between the extending position and the retracting position; a step mounted on the first step bracket and the second step bracket; a single motor mounted on the first mounting bracket and having a motor shaft coupled with the first arm assembly; and a scroll spring configured to be elastically deformed so as to store energy when the single motor drives the first extending and retracting device to move towards the extending position, and to release energy so as to assist the single motor to drive the first extending and retracting device when the motor drives the first extending and retracting device to move towards the retracting position.

Other objects, features and advantages of the present invention will be readily appreciated as the same becomes better understood after reading the subsequent description taken in connection with the accompanying drawings.

DETAILED DESCRIPTION OF THE INVENTION

Figure 1:
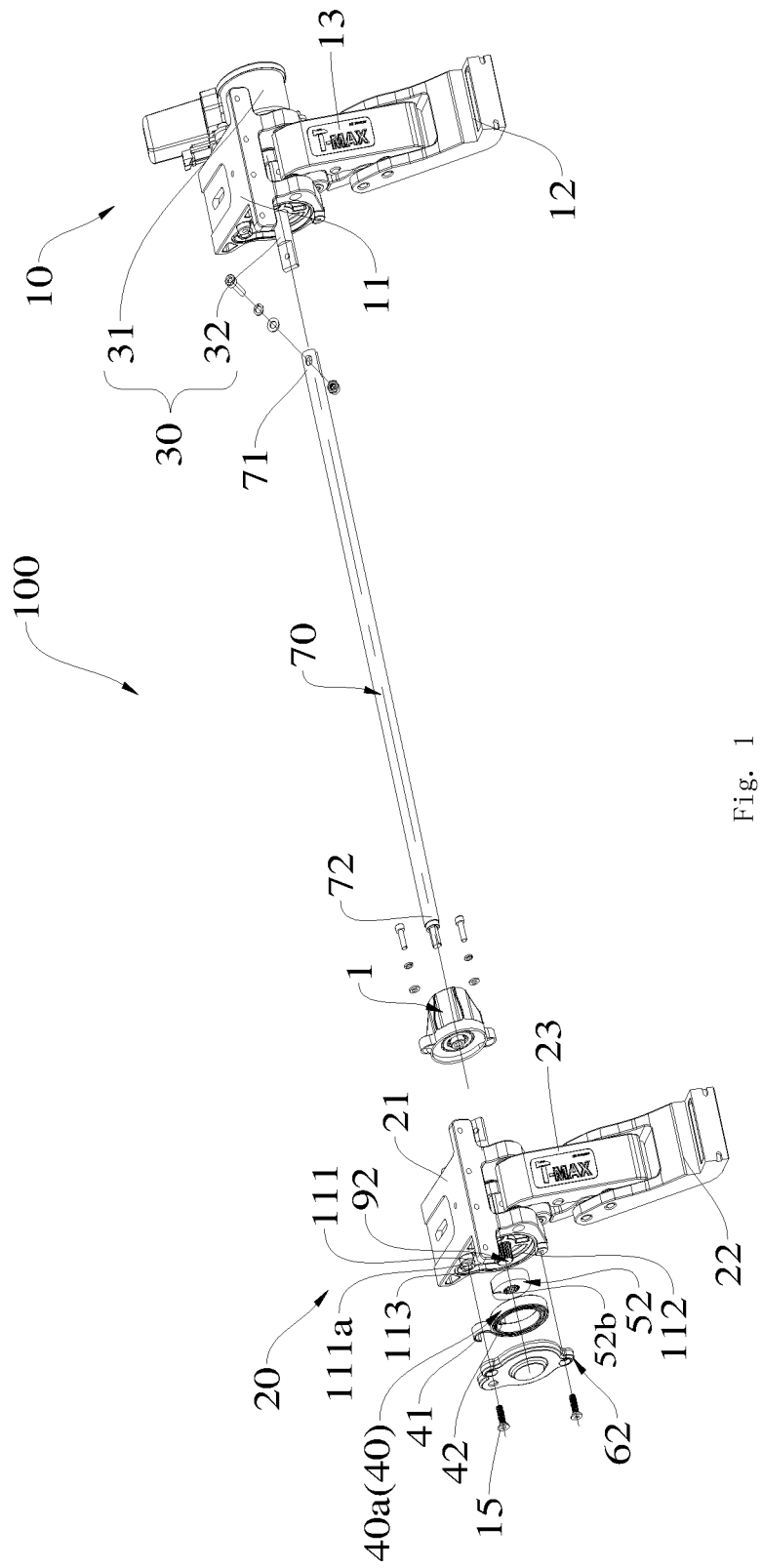
FIG. 1 is a schematic view of a vehicle step apparatus according to an embodiment of the present invention (the step being not shown), wherein the first and the second extending and retracting device are in a extending position.

Reference will be made in detail to embodiments of the present invention. Embodiments of the present invention will be shown in drawings, in which the same or similar members and the members having same or similar functions are denoted by like reference numerals throughout the descriptions. The embodiments described herein according to drawings are explanatory and illustrative, not construed to limit the present invention.

The following description provides a plurality of embodiments or examples configured to achieve different structures of the present invention. In order to simplify the publication of the present invention, components and dispositions of the particular embodiment are described in the following, which are only explanatory and not construed to limit the present invention. In addition, the present invention may repeat the reference number and/or letter in different embodiments for the purpose of simplicity and clarity, and the repeat does not indicate the relationship of the plurality of embodiments and/or dispositions. Moreover, in description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In the description of the present invention, unless specified or limitation otherwise, it should be noted that, terms "mounted," "coupled" and "coupled" may be understood broadly, such as electronic connection or mechanical connection, inner communication between two members, direct connection or indirect connection via intermediary. These having ordinary skills in the art should understand the specific meanings in the present invention according to specific situations.

A vehicle step apparatus 100 according to embodiments of the present invention will be described with reference to the drawings.

As shown in FIG. 1 to FIG. 10, the vehicle step apparatus 100 according to embodiments of the present invention comprises a first extending and retracting device 10, a second extending and retracting device 20, a step 80, a single electric motor 30 and a transmission shaft 70.

Figure 2:
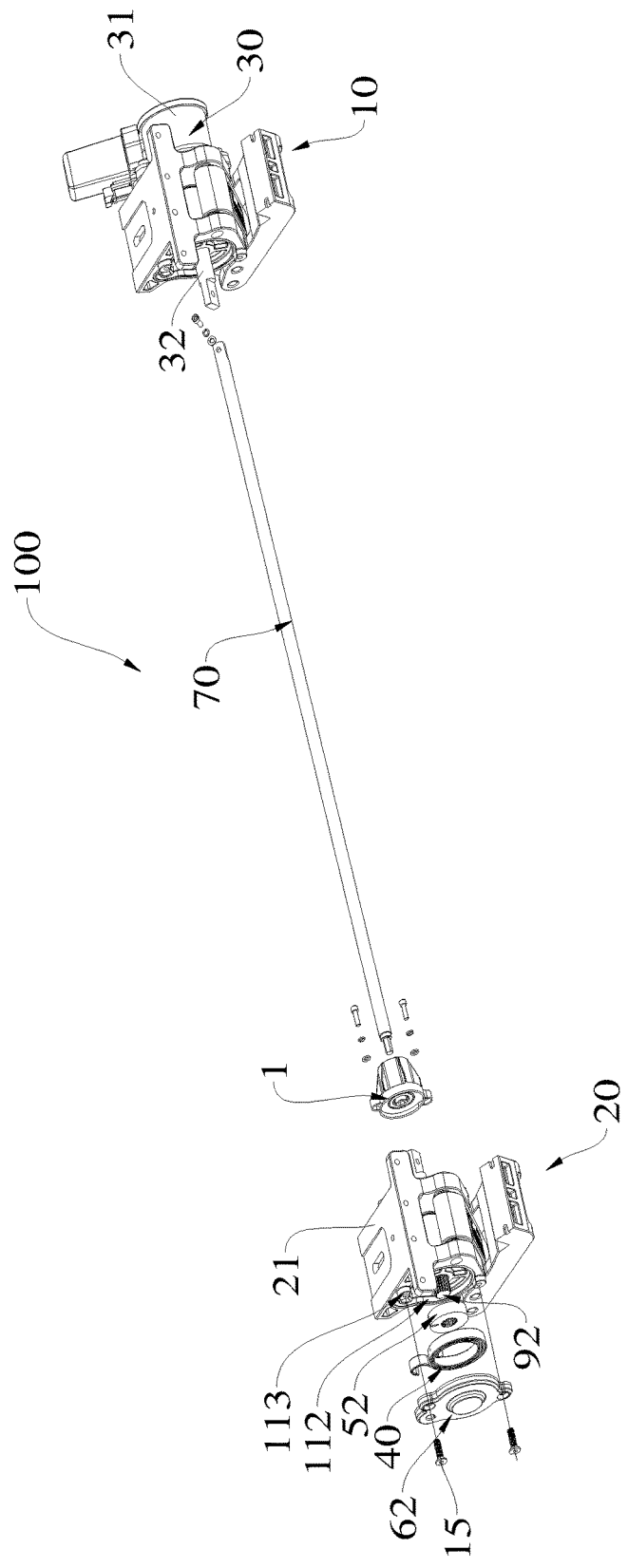
FIG. 2 is a schematic view of a vehicle step apparatus according to an embodiment of the present invention (the step being not shown), wherein the first and the second extending and retracting device are in a retracting position.

The first extending and retracting device 10 comprises a first mounting bracket 11, a first step bracket 12 and a first arm assembly 13. The first arm assembly 13 is coupled between the first mounting bracket 11 and the first step bracket 12, and configured to drive the first step bracket 12 to move between an extending position and a retracting position. As shown in FIG. 1 and FIG. 2, a plurality of lever arms forms the first arm assembly 13 via pivotal connection, at least one lever arm of the first arm assembly 13 is coupled with the first mounting bracket 11, and at least one lever arm of the first arm assembly 13 is coupled with the first step bracket 12.

The second extending and retracting device 20 comprises a second mounting bracket 21, a second step bracket 22 and a second arm assembly 23. The second arm assembly 23 is coupled between the second mounting bracket 21 and the second step bracket 22, and configured to drive the second step bracket 22 to move between the extending position and the retracting position. As shown in FIG. 1 and FIG. 2, a plurality of arms forms the second arm assembly 23 via pivotal connection, at least one arm of the second arm assembly 23 is coupled with the second mounting bracket 21, and at least one arm of the second arm assembly 23 is coupled with the second step bracket 22.

As shown in FIG. 1 and FIG. 2, the step 80 is mounted to the first step bracket 12 and the second step bracket 22, and the single motor 30 is mounted to the first mounting bracket 11. The single motor 30 has a motor shaft 32 coupled with the first arm assembly 13. The transmission shaft 70 defines a first end 71 and a second end 72, the first end 71 is coupled with the motor shaft 32, and the second end 72 is coupled with the second arm assembly 23 via a braking device 1. Specifically, the motor shaft 32 is coupled with one lever arm of the first arm assembly 13, and the transmission shaft 70 is coupled with one lever arm of the second arm assembly 23.

Since the braking device 1 is coupled between the transmission shaft 70 and the second extending and retracting device 20, a driving force of the single motor 30 is transmitted to the second extending and retracting device 20, and a resistance is transmitted from the second extending and retracting device 20 to the transmission shaft 70. In other words, a force which is resist the gravity of the second extending and retracting device 20 and an action force of the step 80 acting on the second extending and retracting device 20, is transmitted to the transmission shaft 70. Thus, it can prevent the first extending and retracting device 10 and the second extending and retracting device 20 from drooping.

In an embodiment, the braking device 1 comprises a braking bush 2, a brake driving shaft 3, a brake driven shaft 4, a brake shoe 5 and a first elastic member 6.

Figure 3:
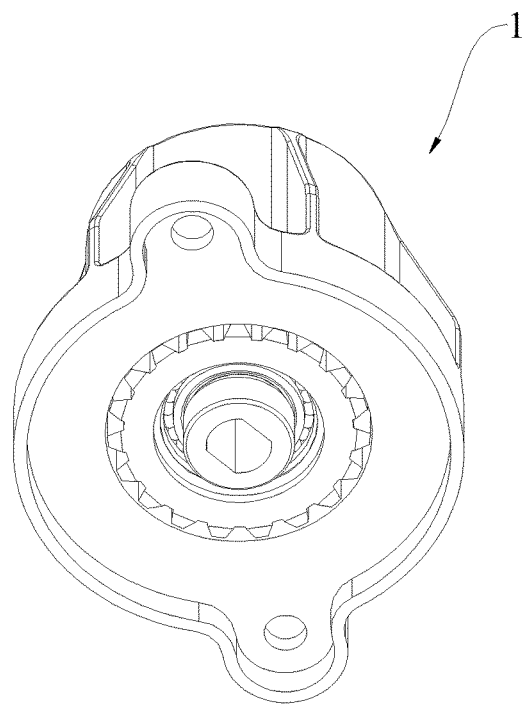
FIG. 3 is a schematic view of a braking device of a vehicle step apparatus according to an embodiment of the present invention.
Figure 4:
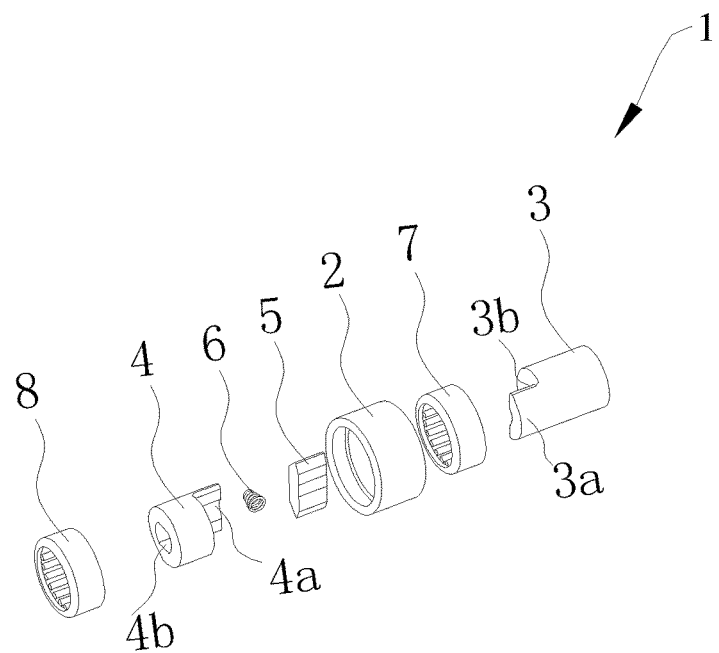
FIG. 4 is an exploded view of a braking device of a vehicle step apparatus according to an embodiment of the present invention.
Figure 5:
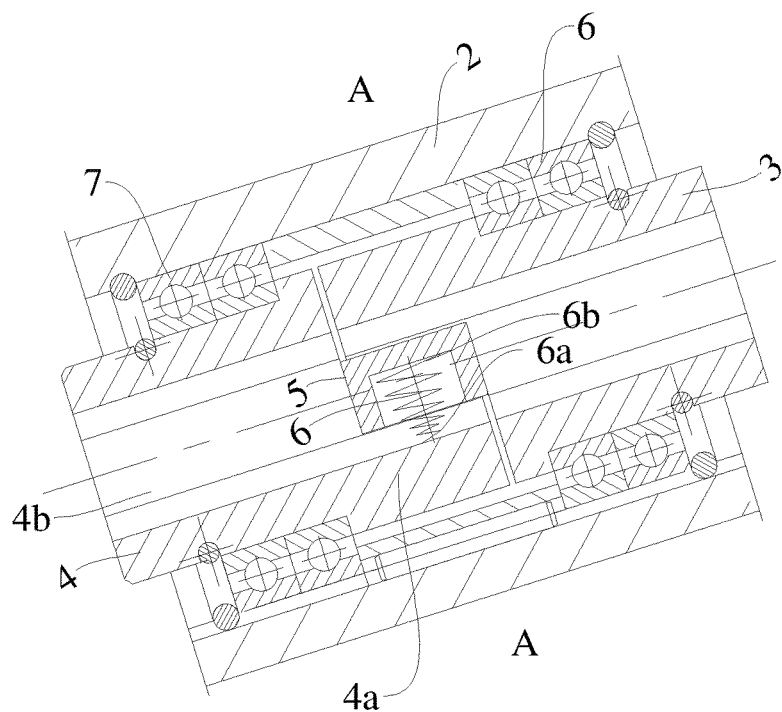
FIG. 5 is a longitudinal sectional view of a braking device of a vehicle step apparatus according to an embodiment of the present invention.

As shown in FIG. 3 to FIG. 5, the brake driving shaft 3 is coupled with the motor output shaft 32 of the single motor 30, and rotatably disposed in the braking bush 2 via a first brake bearing 7 fitted over an outer circumferential surface of the brake driving shaft 3. Specifically, the brake driving shaft 3 defines a first end and a second end. The first end of the brake driving shaft 3 is coupled with the second end of the transmission shaft 70, and the second end of the brake driving shaft 3 is rotatably disposed in the braking bush 2 via the first brake bearing 7.

An end of the brake driving shaft 3 (the right end in FIG. 4) has a first axial protrusion 3a. As shown in FIG. 4, the brake driving shaft 3 has a cylindrical shape, and has a first non-circular center hole 3b. The first axial protrusion 3a is integrally extended outwardly from an end surface of the brake driving shaft 3. As shown in FIG. 4, the first axial protrusion 3a is formed to have an arc shape which is consistent with the shape of a portion of the side wall of the brake driving shaft 3.

In some embodiments, the cross section of the first non-circular center hole 3b has a non-circular shape, such as an elliptical or rectangular shape. An end of the output motor shaft 32 of the single motor 30 has a cross section shape adapted to the first non-circular center hole 3b, so that the driving force (torque) of the single motor 30 can be transmitted to the braking bush 2.

Specifically, the first non-circular center hole 3b is formed in the brake driving shaft 3, the second end of the transmission shaft 70 has a shape adapted to that of the first non-circular center hole 3b and fitted within the first non-circular center hole 3b, and the first end of the transmission shaft 70 is connected to the motor shaft 32 via a first connection shaft 91.

The brake driven shaft 4 is coupled with the second extending and retracting device 20, and rotatably disposed in the braking bush 2 via a second brake bearing 8 fitted over the outer circumferential surface of the brake driven shaft 4. The end of the brake driven shaft 4 opposing to the brake driving shaft 3 (left end in FIG. 4) has a second axial protrusion 4a opposing to the first axial protrusion 3a.

Specifically, the brake driven shaft 4 defines a first end and a second end. The first end of the brake driven shaft 4 is rotatably disposed in the braking bush 2 via the second brake bearing 8, and has a second axial protrusion 4a opposing to the first axial protrusion 3a. The second end of the brake driven shaft 4 is coupled with the second arm assembly 23.

Figure 6:
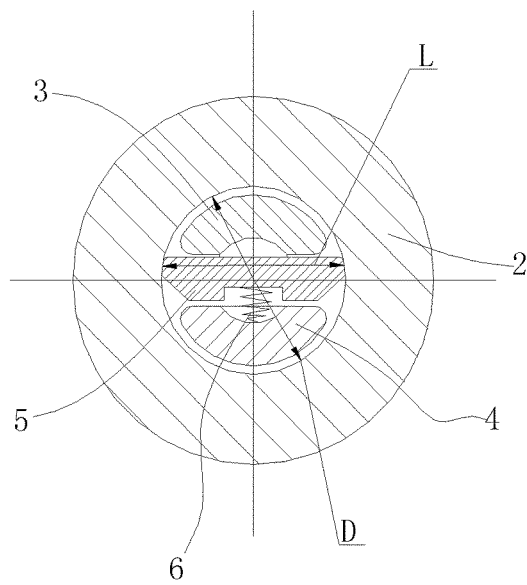
FIG. 6 is a sectional view taken along a line A-A of FIG. 5.

As shown in FIG. 4 and FIG. 6, the brake driven shaft 4 has a cylindrical shape, and has a second non-circular center hole 4b. The second axial protrusion 4a is integrally extended outwardly from an end surface of the brake driven shaft 4. As shown in FIG. 4 and FIG. 6, the second axial protrusion 4a is formed to have an arc shape which is consistent with the shape of a portion of the side wall of the brake driven shaft 4.

The cross section of the second non-circular center hole 4b has a non-circular shape, such as an elliptical or rectangular shape. The second extending and retracting device 20 has a cross section shape adapted to the second non-circular center hole 4b, so that the driving force (torque) of the brake driven shaft 4 can be transmitted to the second extending and retracting device 20.

Specifically, the second non-circular center hole 4b is formed in the brake driven shaft 4, the second arm assembly 23 is connected to the brake driven shaft 4 via a second connection shaft 92, the first end of the second connection shaft 92 has a shape adapted to that of the second non-circular center hole 4b and fitted within the second non-circular center hole 4b.

As shown in FIG. 5 and FIG. 6, the brake shoe 5 is disposed between the first axial protrusion 3a and the second axial protrusion 4a, i.e. the brake shoe 5 is sandwiched between the first axial protrusion 3a and the second axial protrusion 4a. In addition, the thickness at both ends of the brake shoe 5 in the lengthwise direction decreases gradually, in which the lengthwise direction of the brake shoe 5 is consistent with the radial direction of the braking bush 2 when the brake shoe 5 is disposed in the braking bush 2. Namely, both end surfaces of the brake shoe 5 in the lengthwise direction are bevels, and transited to the top surface (the upper surface in FIG. 6) through arcs respectively. Certainly, a person ordinarily skilled in the art can understand that the maximum length L of the brake shoe 5 in the lengthwise direction should be slightly smaller than the inner diameter D of the braking bush 2, so that the brake shoe 5 can rotate in the braking bush 2 when a maximum length part of the brake shoe 5 which is longest passes through the center of the braking bush 2.

The first elastic member 6 defines a first end 6a and a second end 6b. The first end 6a of the first elastic member 6 is coupled with a surface of the second axial protrusion 4a opposing to the first axial protrusion 3a (namely inside surface), and the second end 6b of the first elastic member 6 is coupled with the brake shoe 5 and normally urging the brake shoe 5 towards the first axial protrusion 3a.

In an embodiment, the first elastic member 6 comprises a compression spring.

Operations of the vehicle step apparatus 100 according to an embodiment of the present invention will be described below.

When the step 80 is needed to be moved from the retracting position to the extending position, the single motor 30 rotates clockwise as shown in FIG. 6, and the single motor 30 drives the first extending and retracting device 10 to extend out. At the same time, the driving force (torque) of the single motor 30 is transmitted to the transmission shaft 70 and the brake driving shaft 3, and the brake driving shaft 3 rotates in the braking bush 2 while the first axial protrusion 3a of the brake driving shaft 3 urges the brake shoe 5 toward the second axial protrusion 4a of the brake driven shaft 4 against the elastic force of the first elastic member 6. After the brake shoe 5 moves toward the second axial protrusion 4a, the maximum length portion of the brake shoe 5 passes through the center of the braking bush 2. Since the maximum length L of the brake shoe 5 is slightly smaller than the inner diameter of the braking bush 2, the brake shoe 5 can rotate in the braking bush 2 so that the first axial protrusion 3a can transmit the driving force to the second axial protrusion 4a via the brake shoe 5. The second axial protrusion 4a transmits the driving force to the second extending and retracting device 20 so as to drive the second extending and retracting device 20 to extend out, and then the step 80 is moved from the retracting position to the extending position.

When the step 80 is needed to be moved from the extending position to the retracting position, the single motor 30 rotates counterclockwise as shown in FIG. 6, and the single motor 30 drives the first extending and retracting device 10 to retract. At the same time, the driving force (torque) of the single motor 30 is transmitted to the transmission shaft 70, the brake driving shaft 3 (the first axial protrusion 3a), the brake shoe 5, the brake driven shaft 4 (the second axial protrusion 4a) and the second extending and retracting device 20, so that the first extending and retracting device 10 and the second extending and retracting device 20 are retracted, and then the step 80 is moved to the retracting position.

When the step 80 is in the retracting position, the single motor 30 stops rotating, both the gravity of the step 80 and the gravity of the second extending and retracting device 20 make the first extending and retracting device 10 and second extending and retracting device 20 droop, i.e. make the first extending and retracting device 10 and second extending and retracting device 20 move towards the extending position. A torque generated by the gravity of the step 80 and the gravity of the second extending and retracting device 20 acts on the second extending and retracting device 20.

Since the first extending and retracting device 10 is coupled with the single motor 30 and locked by the single motor 30, the first extending and retracting device 10 does not droop. Since the second extending and retracting device 20 is coupled with the braking device 1, the torque mentioned above is transmitted to the brake driven shaft 4. At the time, the second axial protrusion 4a compresses the first elastic member 6 towards the brake shoe 5 and the first axial protrusion 3a, and the brake shoe 5 moves towards the first axial protrusion 3a under elastic force of the first elastic member 6. At the same time, the second axial protrusion 4a rotates and urges the brake shoe 5 towards the first axial protrusion 3a, so that the maximum length portion of the brake shoe 5 is offset from the center of the braking bush 2.

As shown in FIG. 6, both ends of the brake shoe 5 in the lengthwise direction contacts the inner wall of the braking bush 2, so that the brake shoe 5 cannot be rotated in the braking bush 2 because of the friction therebetween. The second axial protrusion 4a (thus brake driven shaft 4) cannot be further rotated, thus the torque of the second axial protrusion 4a cannot be transmitted to the first axial protrusion 3a via the brake shoe 5, so that the first axial protrusion 3a cannot be rotated, further the transmission shaft 70 cannot be rotated. Thus, the second extending and retracting device 20 is braked so as to prevent the second extending and retracting device 20 from drooping.

Advantageously, the first extending and retracting device 10 is configured as one of a four-link mechanism 10a, a five-link mechanism 10b and a six-link mechanism 10c, and the second extending and retracting device 20 is configured as one of a four-link mechanism 10a, a five-link mechanism 10b and a six-link mechanism 10c.

The structure of the first extending and retracting device 10 will be described as an example below. A person ordinarily skilled in the art can understand that the second extending and retracting device 20 is the same as the first extending and retracting device 10.

Figure 7:
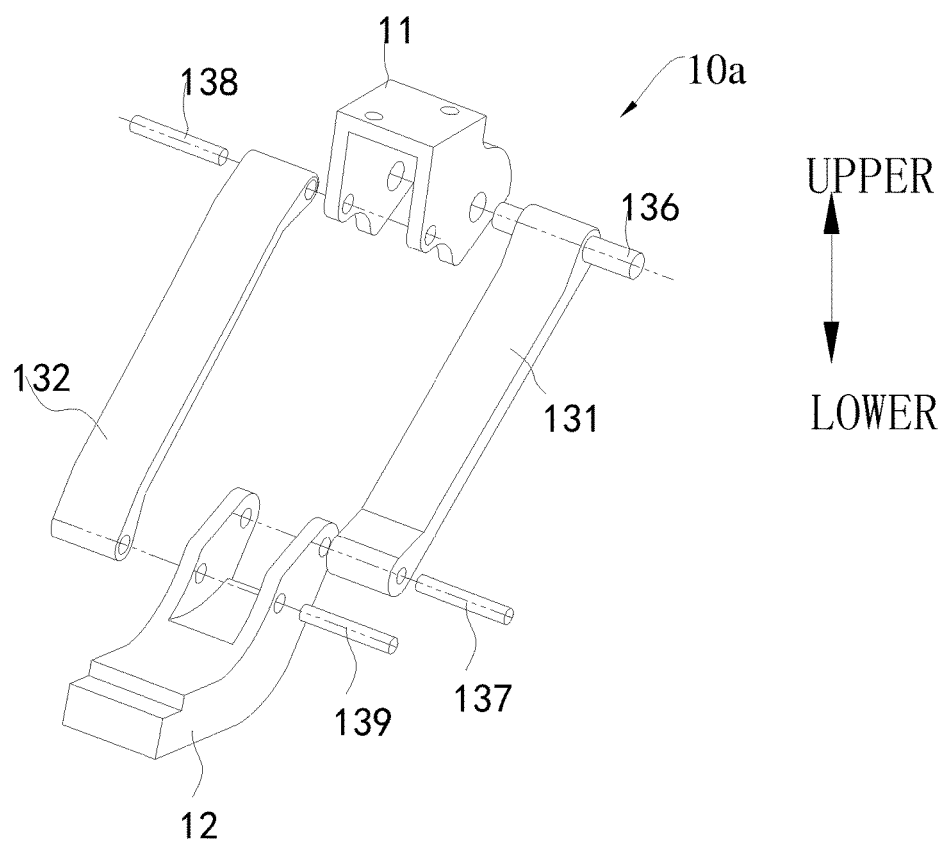
FIG. 7 is a schematic view of a first extending and retracting device of a vehicle step apparatus according to an embodiment of the present invention, wherein the first extending and retracting device is a four-link mechanism.

In an embodiment shown in FIG. 7, the first extending and retracting device 10 is a four-link mechanism 10a, and the first extending and retracting device 10 comprises the first mounting bracket 11, the first step bracket 12 and the first arm assembly 13. The first arm assembly 13 is coupled between the first mounting bracket 11 and the first step bracket 12.

The first arm assembly 13 comprises a first lever arm 131 and a second lever arm 132. An upper end of the first arm 131 is pivotally coupled with the first mounting bracket 11 via a first connection pin 136, and a lower end of the first arm 131 is pivotally coupled with the first step bracket 12 via a second connection pin 137. An upper end of the second arm 132 is pivotally coupled with the first mounting bracket 11 via a third connection pin 138, and a lower end of the second arm 132 is pivotally coupled with the first step bracket 12 via a fourth connection pin 139.

Figure 8:
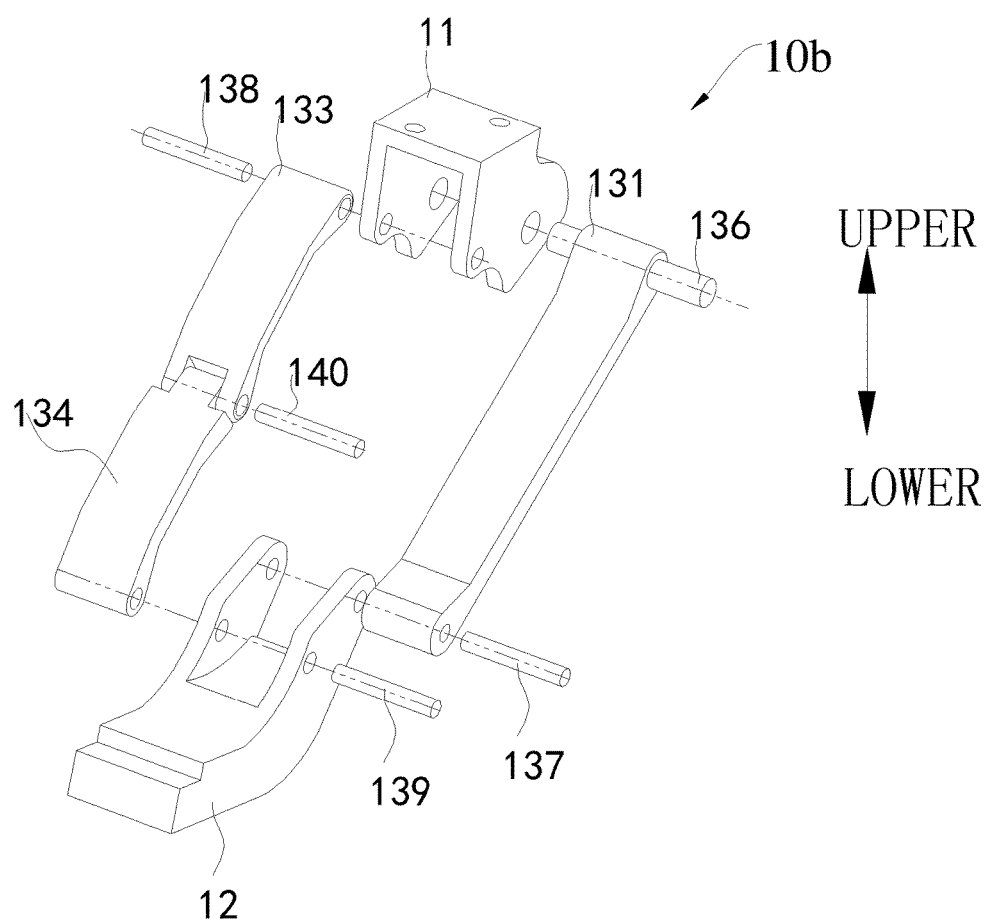
FIG. 8 is a schematic view of a first extending and retracting device of a vehicle step apparatus according to an embodiment of the present invention, wherein the first extending and retracting device is a five-link mechanism.

In an embodiment shown in FIG. 8, the first extending and retracting device 10 is a five-link mechanism 10b, and the first extending and retracting device 10 comprises the first mounting bracket 11, the first step bracket 12 and the first arm assembly 13. The first arm assembly 13 is coupled between the first mounting bracket 11 and the first step bracket 12. The first arm assembly 13 comprises a first lever arm 131, a third lever arm 133 and a fourth lever arm 134.

An upper end of the first arm 131 is pivotally coupled with the first mounting bracket 11 via a first connection pin 136, and a lower end of the first arm 131 is pivotally coupled with the first step bracket 12 via a second connection pin 137. An upper end of the third arm 133 is pivotally coupled with the first mounting bracket 11 via a third connection pin 138, and a lower end of the third arm 133 is pivotally coupled with an upper end of the fourth arm 134 via a fifth connection pin 140. A lower end of the fourth arm 134 is pivotally coupled with the first step bracket 12 via a fourth connection pin 139.

Figure 9:
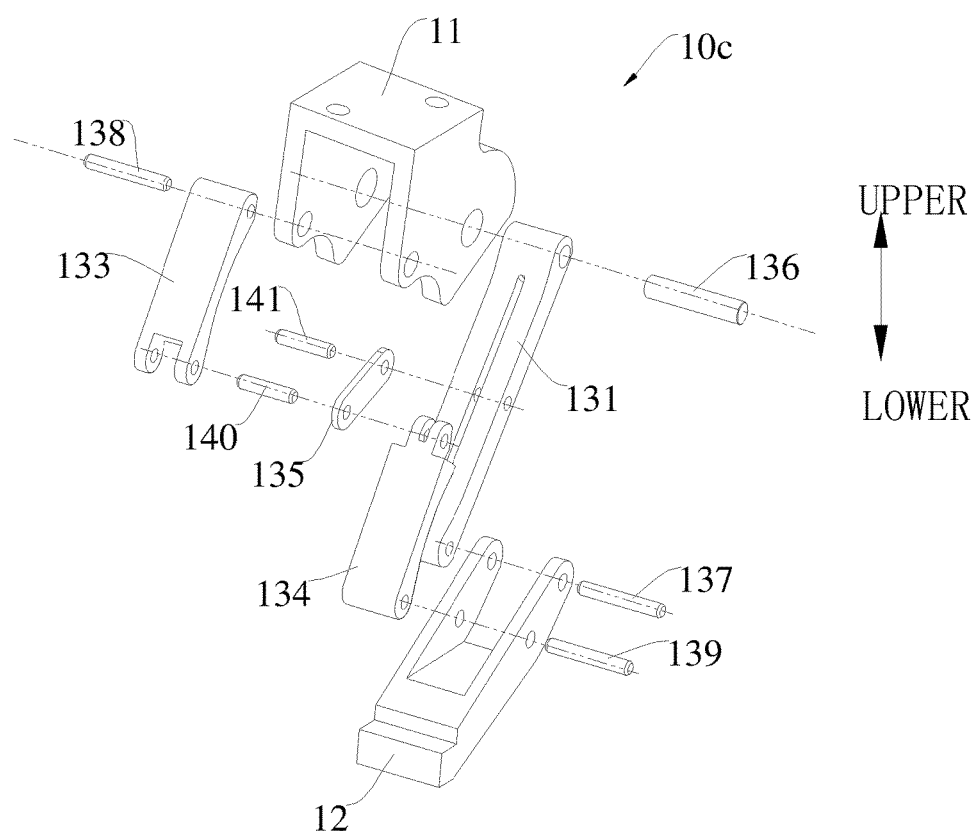
FIG. 9 is a schematic view of a first extending and retracting device of a vehicle step apparatus according to an embodiment of the present invention, wherein the first extending and retracting device is a six-link mechanism.

In an embodiment shown in FIG. 9, the first extending and retracting device 10 is a six-link mechanism 10c, and the first extending and retracting device 10 comprises the first mounting bracket 11, the first step bracket 12 and the first arm assembly 13. The first arm assembly 13 is coupled between the first mounting bracket 11 and the first step bracket 12. The first arm assembly 13 comprises a first lever arm 131, a third lever arm 133, a fourth lever arm 134 and a fifth lever arm 135.

An upper end of the first arm 131 is pivotally coupled with the first mounting bracket 11 via a first connection pin 136, and a lower end of the first arm 131 is pivotally coupled with the first step bracket 12 via a second connection pin 137. An upper end of the third arm 133 is pivotally coupled with the first mounting bracket 11 via a third connection pin 138, and a lower end of the third arm 133 and an upper end of the fourth arm 134 are pivotally coupled with a first end of the fifth arm 135 via a fifth connection pin 140. The second end of the fifth arm 135 is pivotally coupled with a middle portion of the first arm 131 by a sixth connection pin 141. A lower end of the fourth arm 134 is pivotally coupled with the first step bracket 12 via a fourth connection pin 139.

In the embodiments of the above-mentioned first extending and retracting device 10, the motor shaft 32 of the single motor 30 is coupled with the first arm 131 or the second arm 132 via the first connection shaft 91 so as to drive it to rotate, and then the driving force of the single motor 30 is finally transmitted to the first step bracket 12 so as to drive the first step bracket 12 to extend and retract.

As shown in FIG. 1, the motor shaft 32 is coupled with the second end of the transmission shaft 70 by the first connection shaft 91, and the second arm assembly 23 is coupled with the braking device 1 by the second connection shaft 92.

Specifically, the first connection shaft 91 defines a first end and a second end. The first end of the first connection shaft 91 is coupled with the motor shaft 32, and the second end of the first connection shaft 91 is coupled with the transmission shaft 70. The first connection shaft 91, the motor shaft 32 and the transmission shaft 70 are coaxially disposed. Moreover, the first connection shaft 91 is coupled with an arm of the first arm assembly 13.

The second connection shaft 92 defines a first end and a second end. The first end of the second connection shaft 92 is coupled with the braking device 1, and the second end of the second connection shaft 92 is coupled with an arm of the second arm assembly 23. Thus, the driving force of the single motor 30 is transmitted to the first extending and retracting device 10 via the first connection shaft 91 and transmitted to the second extending and retracting device 20 via the first connection shaft 91, the transmission shaft 70 and the second connection shaft 92, so that transmission loss is decreased and the structure of the vehicle step apparatus 100 is more compactly, and then both a movement of the first extending and retracting device 10 and a movement of the second extending and retracting device 20 happen more synchronously.

In some embodiments, the vehicle step apparatus 100 further comprises a second elastic member 40. The second elastic member 40 is configured to elastically deform so as to store energy when the single motor 30 drives the first extending and retracting device 10 and the second extending and retracting device 20 to move towards the extending position, and to release energy so as to assist the single motor 30 to drive the first extending and retracting device 10 and the second extending and retracting device 20 when the single motor 30 drives the first extending and retracting device 10 and the second extending and retracting device 20 to move towards the retracting position.

Specifically, when the motor shaft 32 rotates clockwise as shown in FIG. 6, the motor shaft 32 drives the second elastic member 40 to move and makes the second elastic member 40 be deformed so as to store energy, and the step 80 is moved from the retracting position to the extending position.

When the motor shaft 32 rotates counterclockwise as shown in FIG. 6, the second elastic member 40 releases energy so as to assist the single motor 30 to drive the first extending and retracting device 10 to retract. Thus, both the load and the work current of the single motor 30 are decreased, so that the work current of the single motor 30 in the process of driving the step 80 to extend approximately equals the work current of the single motor 30 in the process of driving the step 80 to retract so as to effectively protect the single motor 30 and prolong work-life of the single motor 30.

More specifically, the first mounting bracket 11 is fixed on a vehicle, at least one arm of the first arm assembly 13 is pivotally coupled with the first mounting bracket 11, and at least one arm of the first arm assembly 13 is pivotally coupled with the first step bracket 12. The motor shaft 32 is coupled with an arm of the first arm assembly 13 so as to drive the first arm assembly 13 to move, and then to drive the first step bracket 12 coupled with the first arm assembly 13 to move. Thus, the single motor 30 rotates clockwise to drive the first extending and retracting device 10 to extend and rotates counterclockwise to drive the first extending and retracting device 10 to retract. Since the structure of the second extending and retracting device 20 is the same as the structure of the first extending and retracting device 10, the course of motion of the second extending and retracting device 20 is not described.

Further, the second elastic member 40 comprises a scroll spring 40a. The scroll spring 40a defines a first end 41 and a second end 42. The first end 41 of the scroll spring 40a is fixed, and the second end 42 of the scroll spring 40a is driven by the motor shaft 32 so as to twist.

Figure 10:
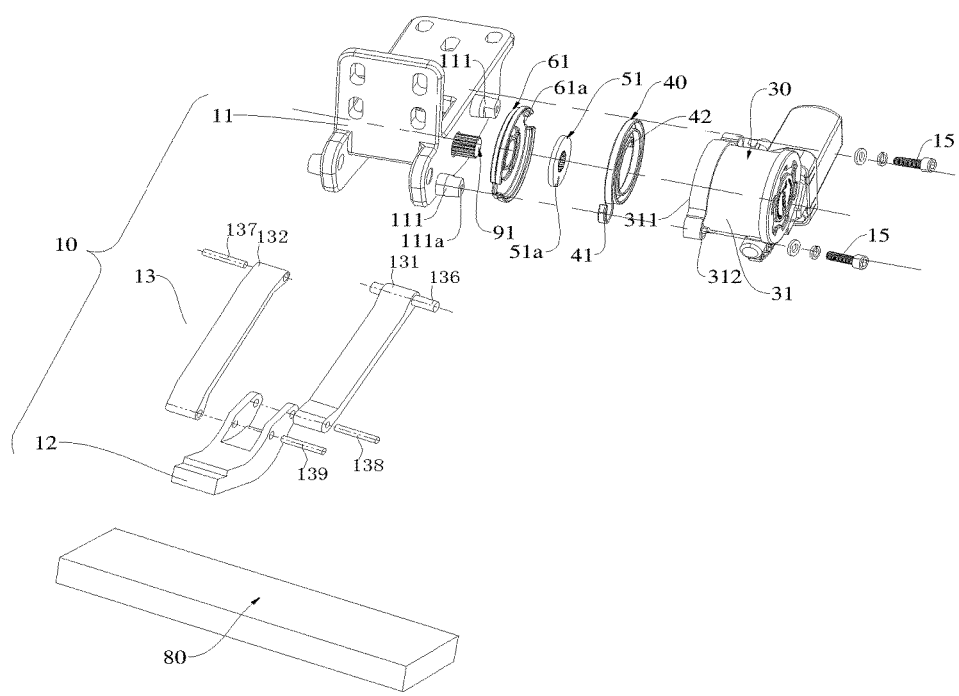
FIG. 10 is a partial schematic view of a vehicle step apparatus according to an embodiment of the present invention.

Specifically, as shown in FIG. 1 and FIG. 10, an end of the outer turn of the scroll spring 40a is bent outwards so as to form the first end 41, an end of the inner turn of the scroll spring 40a is bent inwards so as to form the second end 42. Thus, the first end 41 comprises the end of the outer turn and a portion of the outer turn which is coupled with the end of the outer turn, the second end 42 comprises the end of the inner turn and a portion of the inner turn which is coupled with the end of the inner turn.

When the first extending and retracting device 10 and the second extending and retracting device 20 is extended, i.e. when the step 80 is extended, the first end 41 of the scroll spring 40a is fixed, and the second end 42 of the scroll spring 40a rotates along with the motor shaft 32 and is twisted by the motor shaft 32 so as to store energy.

When the first extending and retracting device 10 and the second extending and retracting device 20 is retracted, i.e. when the step 80 is retracted, the first end 41 of the scroll spring 40a is fixed, and the second end 42 of the scroll spring 40a rotates along with the motor shaft 32 and releases energy so as to assist to drive the first extending and retracting device 10 and the second extending and retracting device 20 to retract. In addition, the structure of the scroll spring 40a is simple and compact, and the scroll spring 40a is easily to be mounted.

Additionally, the elastic member may be elastic sheet, belleville spring or other member which can elastically deform easily.

A suitable scroll spring 40a can be chosen based on the differential between the load of the single motor 30 in the process of driving the step 80 to extend and the load of the single motor 30 in the process of driving the step 80 to retract, so that the load of the single motor 30 in the process of driving the step 80 to extend and the load of the single motor 30 in the process of driving the step 80 to retract can be balanced.

In an embodiment, as shown in FIG. 10, the vehicle step apparatus 100 further comprises a first cover 61 and a first connection plate 51. A first recess is formed in a casing 31 of the single motor 30, and the first cover 61 covers the first recess to define a cavity. The first connection plate 51 is mounted in the cavity and driven by the motor shaft 32 to rotate. The scroll spring 40a is mounted within the cavity, the first end 41 of the scroll spring 40a is fixed to the first cover 61, and the second end 42 of the scroll spring 40a is coupled with the first connection plate 51.

Specifically, the first connecting plate 51 is substantially a circular plate. The first connecting plate 51 is disposed in the cavity, and the first connecting plate 51 defines a first surface opposing to the first recess and a second surface opposing to the first cover 61. The first connecting plate 51 is directly or indirectly coupled with the motor shaft 32 and is driven by the motor shaft 32 to rotate. The scroll spring 40a is fitted over the first connecting plate 51, and the second end 42 of the scroll spring 40a is coupled with the first connecting plate 51 and rotates along with the first connecting plate 51.

Thus, the scroll spring 40a can be integrated in the single motor 30 so as to decrease transmission loss and make the structure of the vehicle step apparatus 100 more compactly.

In some embodiments, the first cover 61 is detachably fastened to the casing 31. A limitation notch 61a is formed in the first cover 61, a limitation column 111 is formed on the first mounting bracket 11, and the limitation column 111 is fitted within the limitation notch 61a to mount the first cover 61 to the first mounting bracket 11. The first end 41 of the scroll spring 40a is fitted over the limitation column 111.

As shown in FIG. 10, the first recess is formed in a side of the casing 31 facing the first mounting bracket 11. The first cover 61 comprises a cover body and a flange coupled with an edge of the cover body. A stepped positioning surface is formed on an inner wall of the flange, and the first cover 61 covers the first recess via the stepped positioning surface. The limitation notch 61a extends from an edge of the first cover 61 to an inner of the first cover 61.

The limitation column 111 is formed on a side of the first mounting bracket 11 opposing to the single motor 30, and a catch groove fitted with the limitation notch 61a is formed in the limitation column 111. The first cover 61 bears against the casing 31 via lower surfaces of the catch groove of two limitation columns 111 so as to limit the first cover 61 in the axial direction. Side surfaces of the catch grooves of two limitation columns 111 limit the first cover 61 in both the radial direction and the circumferential direction. The second end 42 of the scroll spring 40a passes through the limitation notch 61a and is fitted over the limitation column 111.

Thus, the first cover 61, the casing 31 and the first mounting bracket 11 are fixedly coupled together, and a suitable position is provided to mount the second end 42 of the scroll spring 40a, so that a twisted deformation of the scroll spring 40a is decreased during mounting and using.

The first cover 61, the first connecting plate 51 and the first recess may be a circular shape, an elliptical and so on. The number of the limitation notch 61a is more than two, and a plurality of the limitation notch 61a is provided and evenly spaced apart from each other along a circumferential direction of the first cover 61. The number of the limitation column 111 is more than two.

Advantageously, a first catch groove 51a is formed in an outer circumferential surface of the first connection plate 51, and the second end 42 of the scroll spring 40a is inserted into and fitted within the first catch groove 51a. The first connection shaft 91 is coupled with the motor shaft 32 via splined connection and coupled with the transmission shaft 70 via a bolt 15. The first connection plate 51 is fitted over the first connection shaft 91 and coupled with the first connection shaft 91 via splined connection.

Specifically, as shown in FIG. 10, the first catch groove 51a extends from an edge of the first connecting plate 51 to an inner of the first connecting plate 51, and the first catch groove 51a extends along the radial direction of the first connecting plate 51. A center of the first connecting plate 51 has a first spline hole, and the motor shaft 32 has a second spline hole. The first connection shaft 91 has an external spline, and the first connection shaft 91 is coupled with the motor shaft 32 and the first connecting plate 51 via spline connection so as to ensure driving force transmission and make installation and disassembly to be easy.

The first connection shaft 91 is coupled with an arm of the first arm assembly 13 and passes through the first mounting bracket 11. Thus, the single motor 30 drives the first connection shaft 91 and the first connecting plate 51 to rotate, and the second end 42 of the scroll spring 40a fixed on the first connecting plate 51 is rotated along with the first connecting plate 51, so that the scroll spring 40a is twisted tensely.

In an embodiment, a mounting hole 311 is formed in the casing 31, and the limitation column 111 is passed through the mounting hole 311. A threaded hole 111a is formed in the limitation column 111, and the single motor 30 is mounted on the first mounting bracket 11 via a bolt 15 fitted within the threaded hole 111a.

Specifically, the limitation column 111 passes through the limitation notch 61a and bears against the casing 31. The mounting hole 311 of the casing 31 is in one-to-one relationship with the threaded hole 111a of the limitation column 111, and the bolt 15 passes through the mounting hole 311 and is fitted within the threaded hole 111a so as to mount the casing 31 to the first mounting bracket 11. Thus, the single motor 30, the first connecting plate 51 and the first mounting bracket 11 are mounted together via the bolt 15, and it is easy to change and maintain the scroll spring 40a.

In addition, the casing 31, the first connecting plate 51 and the first mounting bracket 11 are mounted together via welding or other suitable manner.

In an embodiment shown in FIG. 1, the second elastic member 40 comprises one scroll spring 40a, and the one scroll spring 40a is mount on an outside of the second mounting bracket 21 away from the first mounting bracket 11. The one scroll spring 40a defines a first end 41 and a second end 42, and the first end 41 is fixed and the second end 42 is driven by the second connection shaft 92 to twist. Thus, the scroll spring 40a provides driving force for the second extending and retracting device 20 so as to prevent a transmission from the motor shaft 32 to the second connection shaft 92 from delaying, so that both a movement of the first extending and retracting device 10 and a movement of the second extending and retracting device 20 happen more synchronously.

In some embodiments, a second recess 112 is formed in the outside of the second mounting bracket 21 away from the first mounting bracket 11, and the second recess 112 is covered by a second cover 62. The first end of the second connection shaft 92 is coupled with the braking device 1, and the second end of the second connection shaft 92 is extended beyond the outside of the second mounting bracket 21. A second connection plate 52 is fitted over and coupled with the second end of the second connection shaft 92 via splined connection, and a second catch groove 52b is formed in an outer circumferential surface of the second connection plate 52.

A catch column 113 is formed on the outside of the second mounting bracket 21, and the catch column 113 is disposed in the second recess 112. The one scroll spring 40a is disposed in the second recess 112, the first end 41 of the one scroll spring 40a is fitted over the catch column 113, and the second end 42 of the one scroll spring 40a is inserted into the second catch groove 52b.

Thus, the motor shaft 32 drives the first connection shaft 91, the transmission shaft 70, the second connection shaft 92 and the second connection plate 52 to rotate in same direction.

In some embodiments, the second elastic member 40 comprises a first scroll spring and a second scroll spring. The first scroll spring is disposed between the single motor and the first mounting bracket 11, and the second scroll spring is disposed on an outside of the second mounting bracket 21 away from the first mounting bracket 11.

A person ordinarily skilled in the art can understand that the numbers of the first extending and retracting device 10, the second extending and retracting device 20 and the scroll spring 40a are more than two. In addition, the first end 41 of the scroll spring 40a is directly coupled with the motor shaft 32, and the second end 42 of the scroll spring 40a is coupled with at least one of the casing 31, the second mounting bracket 21 and the first cover 61.

Figure 11:
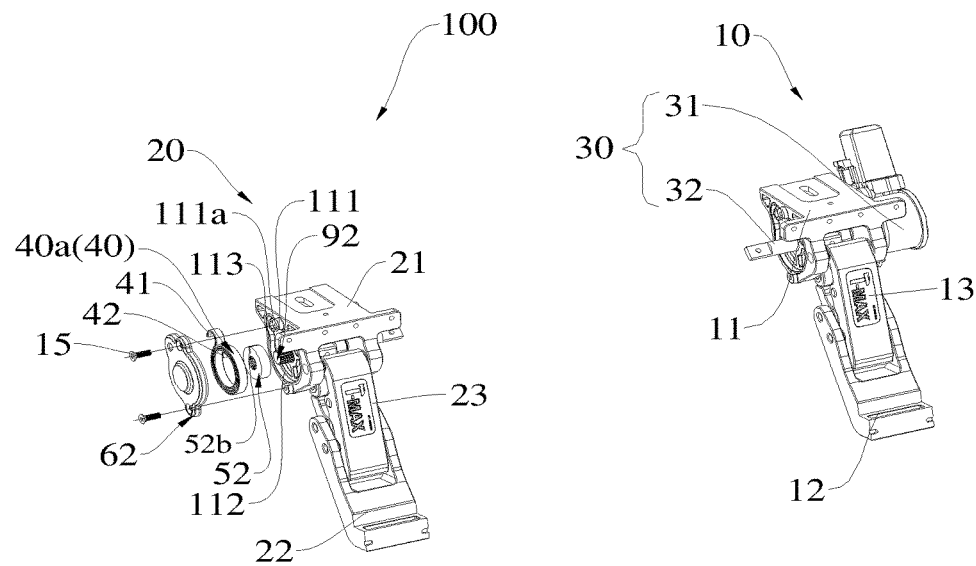
FIG. 11 is a schematic view of a vehicle step apparatus according to another embodiment of the present invention (the step being not shown), wherein the first and the second step brackets are in a extending position.
Figure 12:
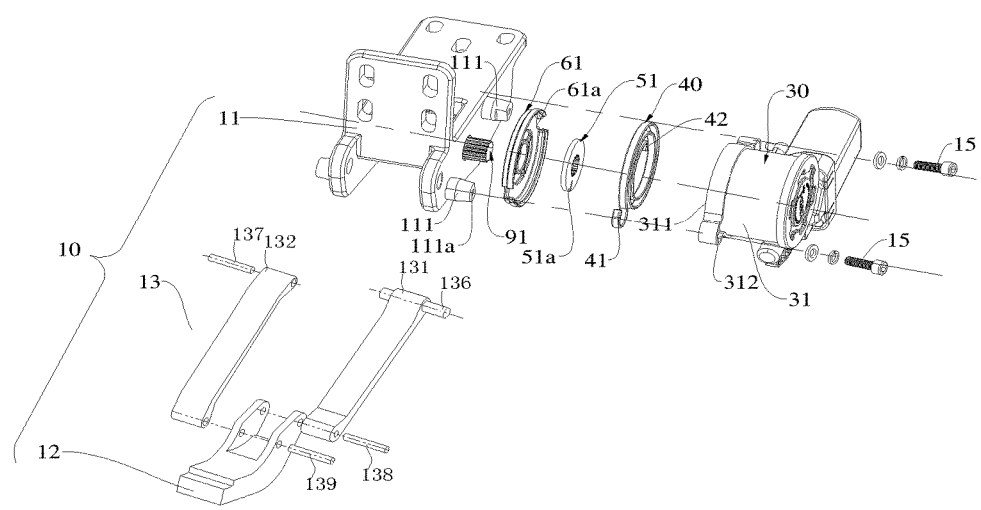
FIG. 12 is a partial schematic view of a vehicle step apparatus according to another embodiment of the present invention.
Figure 13:
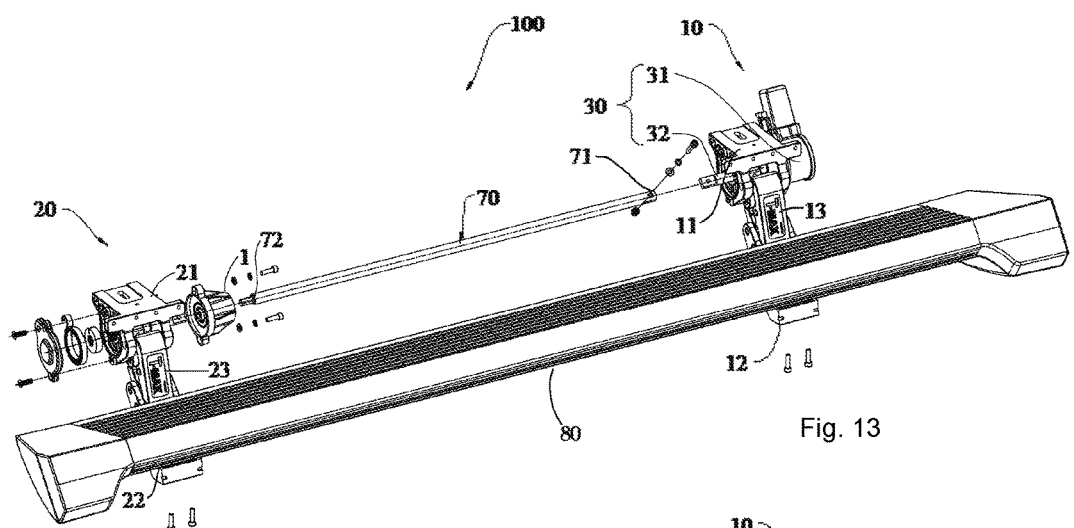
FIG. 13 is a schematic view of the vehicle step apparatus in which the step is mounted on the first step bracket and the second step bracket.
Figure 14:
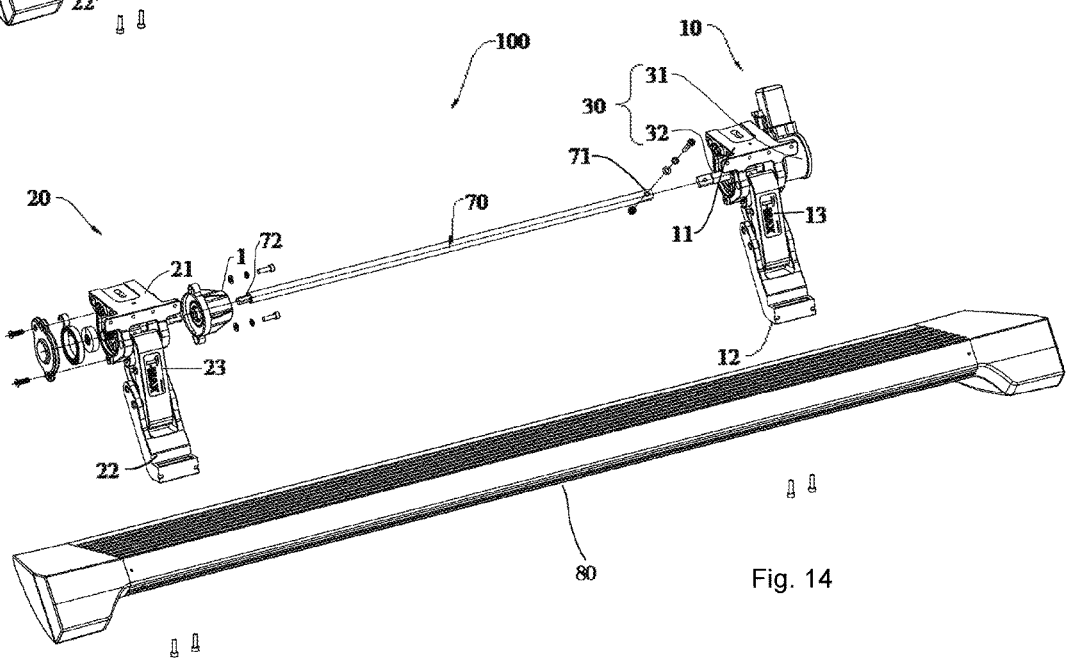
FIG. 14 is a schematic view of the vehicle step apparatus in which the step is separated from the first step bracket and the second step bracket.

In other embodiments shown in FIG. 11 and FIG. 12, the vehicle step apparatus 100 comprises a first extending and retracting device 10, a second extending and retracting device 20, a step 80, a single motor 30 and a scroll spring 40a.

The first extending and retracting device 10 comprises a first mounting bracket 11, a first step bracket 12 and a first arm assembly 13. The first arm assembly 13 is coupled between the first mounting bracket 11 and the first step bracket 12, and configured to drive the first step bracket 12 to move between an extending position and a retracting position.

The second extending and retracting device 20 comprises a second mounting bracket 21, a second step bracket 22 and a second arm assembly 23. The second arm assembly 23 is coupled between the second mounting bracket 21 and the second step bracket 22, and configured to drive the second step bracket 22 to move between the extending position and the retracting position.

The step 80 is mounted on the first step bracket 12 and the second step bracket 22, and the single motor 30 is mounted on the first mounting bracket 11. The single motor 30 has a motor shaft 32 coupled with the first arm assembly 13.

The scroll spring 40a is configured to elastically deform so as to store energy when the single motor 30 drives the first extending and retracting device 10 to move towards the extending position, and to release energy so as to assist the single motor 30 to drive the first extending and retracting device 10 when the single motor 30 drives the first extending and retracting device 10 to move towards the retracting position.

Specifically, when the step 80 is needed to be moved from the retracting position to the extending position, the single motor 30 rotates clockwise as shown in FIG. 6, and the single motor 30 drives the first extending and retracting device 10 to extend out, so that the first step bracket 12 drives the step 80 to be moved from the retracting position to the extending position. At the same time, the step 80 drives the second extending and retracting device 20 to extend out.

When the step 80 is needed to be moved from the extending position to the retracting position, the single motor 30 rotates anticlockwise as shown in FIG. 6, and the single motor 30 drives the first extending and retracting device 10 to retract, so that the first step bracket 12 drives the step 80 to be moved from the extending position to the retracting position. At the same time, the step 80 drives the second extending and retracting device 20 to retract.

In an embodiment, as shown in FIG. 11 and FIG. 12, the vehicle step apparatus 100 further comprises a first cover 61 and a first connection plate 51. A first recess is formed in a casing 31 of the single motor 30, and the first cover 61 first covers the first recess to define a cavity. The first connection plate 51 is mounted in the cavity and driven by the motor shaft 32 to rotate. The scroll spring 40*a* is mounted within the cavity, the first end 41 of the scroll spring 40*a* is fixed in the first cover 61, and the second end 42 of the scroll spring 40*a* is coupled with the first connection plate 51.

Specifically, the first connecting plate 51 is a circular plate. The first connecting plate 51 is disposed in the cavity, and the first connecting plate 51 defines a first surface opposing to the first recess and a second surface opposing to the first cover 61. The first connecting plate 51 is directly or indirectly coupled with the motor shaft 32 and is driven by the motor shaft 32 to rotate. The scroll spring 40*a* is fitted over the first connecting plate 51, and the second end 42 of the scroll spring 40*a* is coupled with the first connecting plate 51 and rotates along with the first connecting plate 51.

In some embodiments, the first cover 61 is detachably fastened to the casing 31. A limitation notch 61*a* is formed in the first cover 61, a limitation column 111 is formed on the first mounting bracket 11, and the limitation column 111 is fitted within the limitation notch 61*a* to mount the first cover 61 on the first mounting bracket 11. The first end 41 of the scroll spring 40*a* is fitted over the limitation column 111.

A first catch groove 51*a* is formed in an outer circumferential surface of the first connection plate 51, and the second end 42 of the scroll spring 40*a* is inserted into and fitted within the first catch groove 51*a*. The first connection shaft 91 is coupled with the motor shaft 32 via splined connection and coupled with the transmission shaft 70 via a bolt, and the first connection plate 51 is fitted over the first connection shaft 91 and coupled with the first connection shaft 91 via splined connection.

As shown in FIG. 11 and FIG. 12, a mounting hole 311 is formed in the casing 31, and the limitation column 111 is passed through the mounting hole 311. A threaded hole 111*a* is formed in the limitation column 111, and the single motor 30 is mounted on the first mounting bracket 11 via a bolt 15 fitted within the threaded hole 111*a*.

One scroll spring 40*a* is provided, and the one scroll spring 40*a* is mounted on an outside of the second mounting bracket 21 away from the first mounting bracket 11. The one scroll spring 40*a* defines a fixed first end 41 and a second end 42 driven by the second connection shaft 92 to twist.

A second recess 112 is formed in the outside of the second mounting bracket 21 and covered by a second cover 61. The first end of the second connection shaft 92 is connected to the braking device 1, and the second end of the second connection shaft 92 is extended beyond the outside of the second mounting bracket 21.

A second connection plate 52 is fitted over and coupled with the second end of the second transmission shaft 70 via splined connection, and a second catch groove 52*b* is formed in an outer circumferential surface of the second connection plate 52. A catch column 113 formed on the outside of the second mounting bracket 21 is disposed in the second recess 112. The one scroll spring 40*a* is disposed in the second recess 112, the first end 41 of the one scroll spring 40*a* is fitted over the catch column 113, and the second end 42 of the one scroll spring 40*a* is inserted into the second catch groove 52*b*.

The scroll spring 40*a* comprises a first scroll spring and a second scroll spring. The first scroll spring is disposed between the single motor 30 and the first mounting bracket 11, and the second scroll spring is disposed on an outside of the second mounting bracket 21.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. The appearances of the phrases throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A vehicle step apparatus, comprising:
 a first extending and retracting device comprising a first mounting bracket, a first step bracket, and a first arm assembly coupled between the first mounting bracket and the first step bracket and configured to drive the first step bracket to move between an extending position and a retracting position;
 a second extending and retracting device comprising a second mounting bracket, a second step bracket, and a second arm assembly coupled between the second mounting bracket and the second step bracket and configured to drive the second step bracket to move between the extending position and the retracting position;
 a step mounted on the first step bracket and the second step bracket;
 a single motor mounted on the first mounting bracket and having a motor shaft coupled with the first arm assembly; and
 a transmission shaft defining a first end coupled with the motor shaft, and a second end coupled with the second arm assembly via a braking device,
 wherein the braking device comprises:
 a braking bush;
 a brake driving shaft defining a first end coupled with the second end of the transmission shaft, and a second end rotatably disposed in the braking bush and having a first axial protrusion;
 a brake driven shaft defining a first end rotatably disposed in the braking bush and having a second axial protrusion opposing to the first axial protrusion, and a second end coupled with the second arm assembly;
 a brake shoe disposed between the first axial protrusion and the second axial protrusion; and
 a first elastic member defining a first end connected to a surface of the second axial protrusion opposing to the first axial protrusion, and a second end connected to the brake shoe and normally urging the brake shoe towards the first axial protrusion.

2. The vehicle step apparatus according to claim 1, wherein the first elastic member comprises a compression spring.

3. The vehicle step apparatus according to claim 1, wherein a first non-circular center hole is formed in the brake driving shaft, the second end of the transmission shaft has a shape adapted to that of the first non-circular center hole and fitted within the first non-circular center hole, the first end of the transmission shaft is connected to the motor shaft via a first connection shaft; and wherein a second non-circular center hole is formed in the brake driven shaft, the second arm assembly is connected to the brake driven shaft via a second connection shaft, the first end of the second connection shaft has a shape adapted to that of the second non-circular center hole and fitted within the second non-circular center hole.

4. The vehicle step apparatus according to claim 3, wherein the motor shaft is connected to the second end of the transmission shaft by the first connection shaft, the second arm assembly is connected to the braking device by the second connection shaft.

5. The vehicle step apparatus according to claim 4, further comprising a second elastic member configured to elastically deform so as to store energy when the single motor drives the first and second extending and retracting device to move towards the extending position, and to release energy so as to assist the motor to drive the first and second extending and retracting devices when the single motor drives the first and second extending and retracting device to move towards the retracting position.

6. The vehicle step apparatus according to claim 5, the second elastic member comprises a scroll spring defining a fixed first end and a second end driven by the motor shaft so as to twist.

7. The vehicle step apparatus according to claim 6, further comprising a first cover and a first connection plate, wherein a first recess is formed in a casing of the single motor, and the first cover first covers the first recess to define a cavity, wherein the first connection plate is mounted in the cavity and driven by the motor shaft to rotate, and wherein the scroll spring is mounted within the cavity, the first end of the scroll spring is fixed in the first cover, and the second end of the scroll spring is coupled with the first connection plate.

8. The vehicle step apparatus according to claim 7, wherein the first cover is detachably fastened to the casing, wherein a limitation notch is formed in the first cover, and a limitation column is formed on the first mounting bracket, the limitation column is fitted within the limitation notch to mount the first cover on the first mounting bracket, and wherein the first end of the scroll spring is fitted over the limitation column.

9. The vehicle step apparatus according to claim 8, wherein a first catch groove is formed in an outer circumferential surface of the first connection plate, and the second end of the scroll spring is inserted into and fitted within the first catch groove, and wherein the first connection shaft is coupled with the motor shaft via splined connection and connected to the transmission shaft via a bolt, the first connection plate is fitted over the first connection shaft and coupled with the first connection shaft via splined connection.

10. The vehicle step apparatus according to claim 9, wherein a mounting hole is formed in the casing, and the limitation column is passed through the mounting hole, and wherein a threaded hole is formed in the limitation column, and the single motor is mounted on the first mounting bracket via a bolt fitted within the threaded hole.

11. The vehicle step apparatus according to claim 5, wherein the second elastic member comprises one scroll spring, the one scroll spring is mount on an outside of the second mounting bracket away from the first mounting bracket, and wherein the one scroll spring defines a fixed first end and a second end driven by the second connection shaft to twist.

12. The vehicle step apparatus according to claim 11, wherein a second recess is formed in the outside of the second mounting bracket and first covered by an second cover, wherein the first end of the second connection shaft is connected to the braking device, and the second end of the second connection shaft is extended beyond the outside of the second mounting bracket, a second connection plate is fitted over and coupled with the second end of the second transmission shaft via splined connection, and a second catch groove is formed in an outer circumferential surface of the second connection plate, wherein a catch column formed on the outside of the second mounting bracket is disposed in the second recess, and wherein the one scroll spring is disposed in the second recess, the first end of the one scroll spring is fitted over the catch column, and the second end of the one scroll spring is inserted into the second catch groove.

13. The vehicle step apparatus according to claim 5, wherein the second elastic member comprises a first scroll spring and a second scroll spring, wherein the first scroll spring is disposed between the single motor and the first mounting bracket, and the second scroll spring is disposed on an outside of the second mounting bracket.

14. The vehicle step apparatus according to claim 1, wherein the first extending and retracting device is configured as one of a four-link mechanism, a five-link mechanism and a six-link mechanism, and the second extending and retracting device is configured as one of a four-link mechanism, a five-link mechanism and a six-link mechanism.

15. A vehicle step apparatus, comprising:

a first extending and retracting device comprising a first mounting bracket, a first step bracket, and a first arm assembly coupled between the first mounting bracket and the first step bracket and configured to drive the first step bracket to move between an extending position and a retracting position;

a second extending and retracting device comprising a second mounting bracket, a second step bracket, and a second arm assembly coupled between the second mounting bracket and the second step bracket and configured to drive the second step bracket to move between the extending position and the retracting position;

a step mounted on the first step bracket and the second step bracket;

a single motor mounted on the first mounting bracket and having a motor shaft coupled with the first arm assembly; and a scroll spring configured to elastically deform so as to store energy when the single motor drives the first extending and retracting device to move towards the extending position, and to release energy so as to assist the single motor to drive the first extending and retracting device when the motor drives the first extending and retracting device to move towards the retracting position.

16. The vehicle step apparatus according to claim 15, further comprising a first cover and a first connection plate,
   wherein a first recess is formed in a casing of the motor, and the first cover first covers the first recess to define a cavity,
   wherein the first connection plate is mounted in the cavity and driven by the motor shaft to rotate,
   wherein the scroll spring is mounted within the cavity, the first end of the scroll spring is fixed in the first cover, and the second end of the scroll spring is coupled with the first connection plate,
   wherein the first cover is detachably fastened to the casing,
   wherein a limitation notch is formed in the first cover, and a limitation column is formed on the first mounting bracket, the limitation column is fitted within the limitation notch to mount the first cover on the first mounting bracket, and
   wherein the first end of the scroll spring is fitted over the limitation column.

17. The vehicle step apparatus according to claim 16,
   wherein a first catch groove is formed in an outer circumferential surface of the first connection plate, and the second end of the scroll spring is inserted into and fitted within the first catch groove,
   wherein a first connection shaft is coupled with the motor shaft via splined connection and connected to the transmission shaft via a bolt, the first connection plate is fitted over the first connection shaft and coupled with the first connection shaft via splined connection.

18. The vehicle step apparatus according to claim 17, wherein a mounting hole is formed in the casing, and the limitation column is passed through the mounting hole, wherein a threaded hole is formed in the limitation column, and the single motor is mounted on the first mounting bracket via a bolt fitted within the threaded hole.

19. The vehicle step apparatus according to claim 15, wherein one scroll spring is provided, the one scroll spring is mount on an outside of the second mounting bracket away from the first mounting bracket,
   wherein the one scroll spring defines a fixed first end and a second end driven by a second connection shaft to twist,
   wherein a second recess is formed in the outside of the second mounting bracket and first covered by an second cover,
   wherein the first end of the second connection shaft is connected to the braking device, and the second end of the second connection shaft is extended beyond the outside of the second mounting bracket,
   a second connection plate is fitted over and coupled with the second end of the second transmission shaft via splined connection, and a second catch groove is formed in an outer circumferential surface of the second connection plate,
   wherein a catch column formed on the outside of the second mounting bracket is disposed in the second recess, and
   wherein the one scroll spring is disposed in the second recess, the first end of the one scroll spring is fitted over the catch column, and the second end of the one scroll spring is inserted into the second catch groove.

20. The vehicle step apparatus according to claim 15, wherein scroll spring comprises a first scroll spring and a second scroll spring, wherein the first scroll spring is disposed between the single motor and the first mounting bracket, and the second scroll spring is disposed on an outside of the second mounting bracket.

* * * * *